United States Patent
Phillips et al.

(10) Patent No.: US 8,251,294 B2
(45) Date of Patent: Aug. 28, 2012

(54) PAYMENT DEVICE HAVING APPEAL FOR STATUS CONSUMERS

(75) Inventors: Simon Phillips, York (GB); Stephen Marshall-Rees, Hampshire (GB)

(73) Assignee: MasterCard International, Inc., Purchase, NY (US)

( * ) Notice: Subject to any disclaimer, the term of this patent is extended or adjusted under 35 U.S.C. 154(b) by 392 days.

(21) Appl. No.: 12/496,857

(22) Filed: Jul. 2, 2009

(65) Prior Publication Data

US 2011/0000968 A1    Jan. 6, 2011

(51) Int. Cl.
*G06K 19/06* (2006.01)

(52) U.S. Cl. ........................................ 235/492; 235/487

(58) Field of Classification Search ................... 235/492, 235/487

See application file for complete search history.

(56) References Cited

U.S. PATENT DOCUMENTS

| | | | |
|---|---|---|---|
| 3,069,793 A | 12/1962 | Francescon | |
| 6,025,283 A | 2/2000 | Roberts | |
| 6,764,014 B2 | 7/2004 | Lasch et al. | |
| 7,398,931 B2 | 7/2008 | Lasch et al. | |
| 2005/0040242 A1* | 2/2005 | Beenau et al. | 235/492 |

* cited by examiner

*Primary Examiner* — Karl D Frech

(74) *Attorney, Agent, or Firm* — Buckley, Maschoff & Talwalkar LLC

(57) ABSTRACT

An identification token includes a plastic body and an RFID IC embedded or contained in the body. An antenna is also embedded or contained in the body and is coupled to the RFID IC. A metallic coating is formed on the plastic body and is sufficiently thin so as permit wireless RF communication between the RFID IC and a proximity reader via the antenna. A clear protective coating is formed on the metallic coating so as to allow the metallic coating to be visible to a holder of the identification token.

16 Claims, 5 Drawing Sheets

PAYMENT DEVICE HAVING APPEAL FOR STATUS CONSUMERS

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal. The authorization request is routed from the merchant's acquiring financial institution ("acquirer") to a server computer operated by or on behalf of the issuer of the payment account. The issuer's server computer provides a response to the authorization request. If the response indicates that the issuer has authorized the transaction, the transaction is consummated at the point of sale. Later the transaction is cleared for settlement via the acquirer and the issuer.

More recently, cards that incorporate an integrated circuit (IC) have been utilized as payment cards. One type of IC payment card is known as a "proximity payment card" and is in widespread use. For example, proximity payment cards in the well-known ID-1 standard size incorporate a radio frequency identification (RFID) integrated circuit (IC) and an antenna. In use, the card is presented to a proximity reader that is part of a point of sale (POS) terminal to initiate a payment transaction. The card receives a wireless interrogation signal from the proximity reader via the card antenna. The interrogation signal powers up the RFID IC, which exchanges RF communications with the proximity reader. As part of the communications, the RFID IC provides a payment account number to the POS terminal. The POS terminal uses the payment account number to obtain authorization for the payment transaction.

Proximity payment devices in form factors other than ID-1 have also been proposed. For example, a card-shaped proximity payment device may be much smaller than ID-1-sized and may be installed into a plastic casing to take on the form of a keyfob. Such an arrangement is disclosed, for example, in U.S. published patent application no. 2008/0121707 which is commonly assigned herewith and which is incorporated herein by reference. Alternatively, the device itself may be fob-shaped and may include a hole for receiving a keyring.

According to a further proposal, proximity payment functionality may be incorporated in a wristwatch, as disclosed for example in U.S. published patent application no. 2009/0065587, which also is commonly assigned herewith and incorporated herein by reference.

When IC payment devices are in the ID-1 form factor, they generally are well-accepted by consumers, in view of the long history of carrying and using similar-appearing magnetic stripe payment cards. For at least some situations, however, a fob-sized payment device may provide greater convenience, if only by taking up less space in purse, wallet or pocket. However, there has been some resistance to fob-shaped payment devices among consumers. It appears that consumers in some cases tend not to ascribe high value or status to fob-shaped payment devices and have the perception that such devices are cheap and disposable rather than worthwhile possessions.

DETAILED DESCRIPTION

In general, and for the purpose of introducing concepts of embodiments of the present invention, the perceived value of payment devices is enhanced by various decorative and other strategies. For example, a metallic coating may be applied to the plastic body of a contactless payment card or fob. The metallic coating may be thin enough that it does not interfere with wireless RF communication between the device and a reader. A clear protective coating is formed over the metallic coating, which remains visible through the protective coating. In this way, payment devices may be provided that have something of the appeal of jewelry or other high-status accessories. The status-related appeal of such payment devices may in some embodiments be further enhanced with simulated or real precious stones mounted on the outer surface of the payment device.

As an alternative or additional strategy for enhancing the perceived value of small payment devices, additional weight may be added to the payment devices by embedding relatively high density weighting elements in the plastic bodies of the payment devices.

Figure 1:
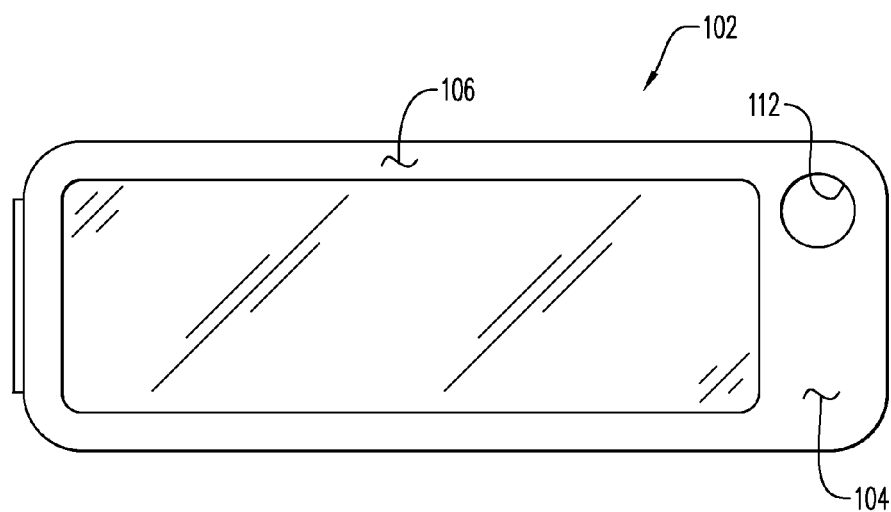
FIG. 1 is a plan view of a payment device according to some embodiments.
Figure 2:
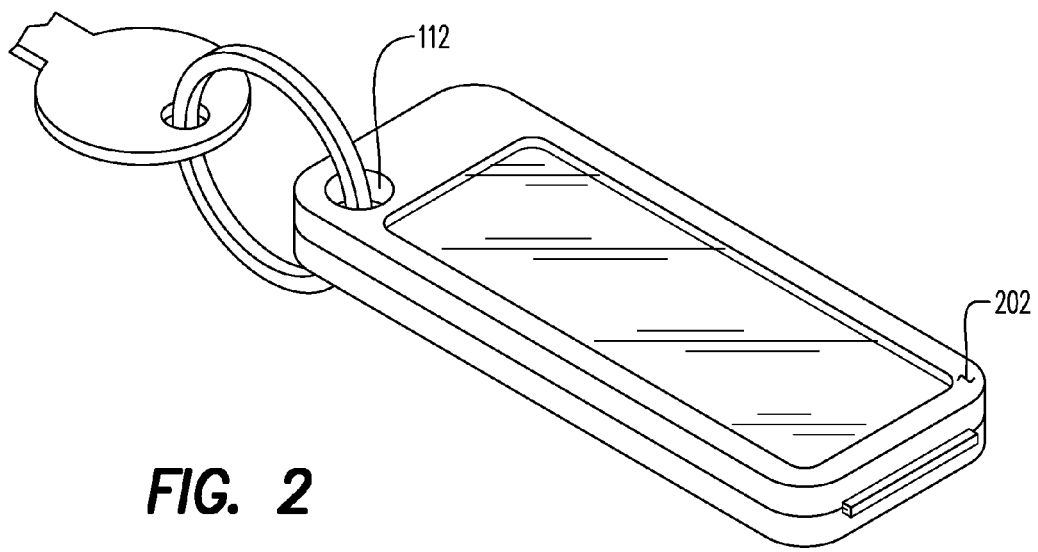
FIG. 2 is a perspective view showing the payment device of FIG. attached to a keyring.

FIG. 1 is a plan view, and FIG. 2 is a perspective view, of a payment device 102 according to some embodiments. The payment device 102, shown somewhat larger than life size, generally is in the form of a fob. The payment device 102 is suitable for initiating contactless payment purchase transactions at a point of sale terminal (not shown) in conjunction with a payment card system. Internal components of the payment device 102 will be described below. What is salient about the payment device 102 is that large portions of it (e.g., at 104 and 106, and at 202 in FIG. 2) exhibit a shiny metallic finish. The finish may resemble, or even actually be, yellow or white gold or platinum, such that the payment device 102 may be perceived as an accessory that is in the category of jewelry. To enhance the perception of the payment device 102 as jewelry, precious, semi-precious and/or simulated precious stones (not shown) may be mounted on the payment device 102 as decorative elements. It will also be noted that the payment device 102 includes a hole 112 at one end for accepting a keyring.

With the high status "look" presented by payment device 102, it may (more readily than a thin plastic payment fob) gain acceptance as part of the sartorial style of well-dressed upper-income individuals, such that the esthetic design of the payment device 102 may facilitate the market penetration of small form-factor contactless payment devices.

Figure 3:
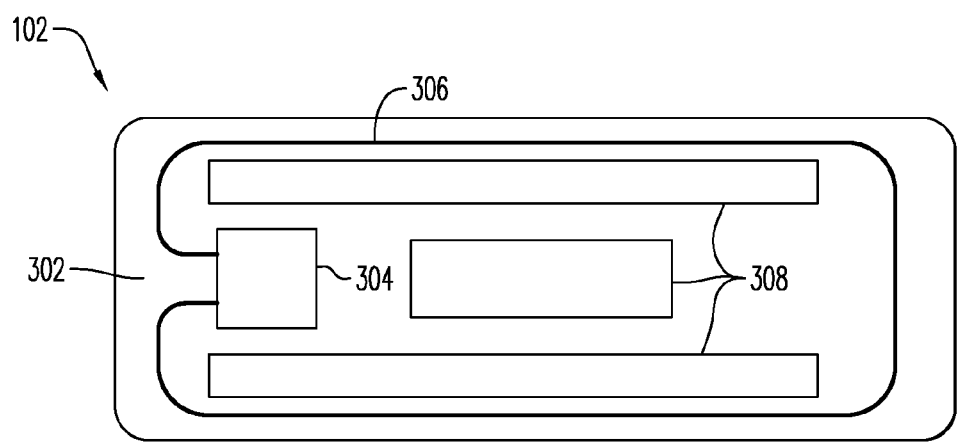
FIG. 3 is a schematic plan view of the payment device of FIGS. 1 and 2, showing internal components thereof.

FIG. 3 is a schematic plan view of the payment device 102, showing internal components thereof.

As seen from FIG. 3, the payment device 102 may include a small card-shaped plastic body 302. The payment device 102 may also include an RFID IC 304. The RFID IC 304 may be mounted and/or installed in any suitable manner in the card-shaped body 302. For example, the RFID IC 104 may be embedded (partially or completely) in the card-shaped body 302. The RFID IC 304 may be suitably designed and configured to transmit payment card account information by radio frequency signaling to a POS terminal. In general, the RFID IC 304 may be designed and configured to operate in accordance with the "PayPass" standard promulgated by Master-Card International Incorporated, the assignee hereof.

The payment device 102 may further include an antenna 306 embedded in or otherwise mounted on the card-shaped body 302. As shown, the antenna 306 may be in the form of a loop arranged along the periphery of the card-shaped body 302. Alternatively, the antenna 106 may be of a different type and/or configuration, including for example several loops arranged along the periphery of the card-shaped body. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

Further internal components of the payment device 102 may include one or more weighting elements 308 that are embedded in the plastic body 302. The weighting elements 308 have the purpose of increasing the perceived value of the payment device 102 by increasing its weight and thereby reducing the likelihood that the user will perceive it as a cheap plastic item. The weighting elements 308 may, for example, be formed of a material that has twice, or even four times, as great a specific gravity as the plastic from which the body 302 is formed. For example, the weighting elements 308 may be formed of metal (e.g., soft iron), ceramic or granite. If metal, the weighting elements 308 are preferably positioned in the plastic body 302 so as not to prevent wireless RF communication between the RFID IC 304 and a proximity reader (not shown) via the antenna 306. Further details will be provided below of one embodiment of the weighting elements 308.

Figure 4:
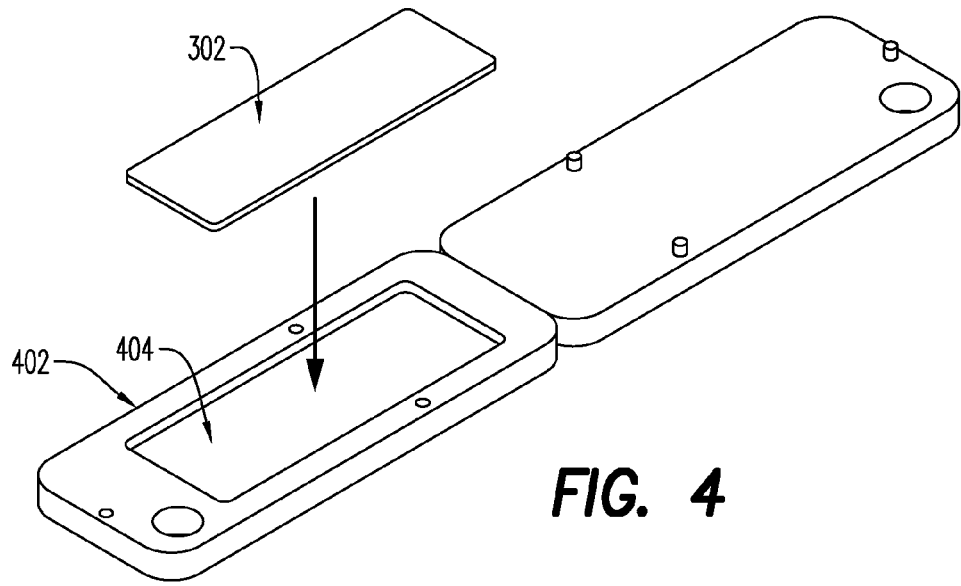
FIG. 4 is a perspective view which schematically illustrates assembly of some examples of the payment device of FIGS. 1-3.

The plastic body 302 has been described above as card-shaped, but such need not necessarily be the case. For example, the plastic body 302 may have considerable thickness so as to present a three-dimensional profile as illustrated in FIG. 2, while supporting the exterior jewelry-like finish as described above. Alternatively, however, the plastic body 302 may indeed be relatively thin, e.g. with a thickness like that called for by the ID-1 standard (though of lesser planar extent), and an appearance for the payment device 102 as seen from FIG. 2 may be achieved by having the plastic body 302 (with the other elements illustrated in FIG. 3) contained within a case or holder 402 (FIG. 4) that provides the desired jewelry-emulating external appearance. More specifically, and as shown in FIG. 4, the holder 402 may open in clam-shell fashion to expose an internal cavity 404, into which the plastic body 302 may be inserted. One portion of the holder 402 may be pivoted to join the other to close the cavity 404 with the plastic body 302 contained in the cavity 404. In this way the payment device 102 may be assembled. When closed, the holder 402 may have an external appearance like that shown in and described in connection with FIGS. 1 and 2, although the holder 402 may be predominantly composed of an inexpensive material such as plastic. In some embodiments, the holder 402 may contain weighting elements, such as those referred to above, in addition to or instead of the plastic body 302 including such weighting elements.

In an alternative embodiment of the holder, it may not have a clam-shell design, but rather may have a slot at one end, by which the plastic body 302 may be longitudinally inserted into the cavity.

Up to this point, the payment device has been described as being fob-shaped. Alternatively, however, it may be card-shaped, e.g., by having the standard ID-1 dimensions. A payment device 502 of this variety is illustrated in FIG. 5.

Figure 5:
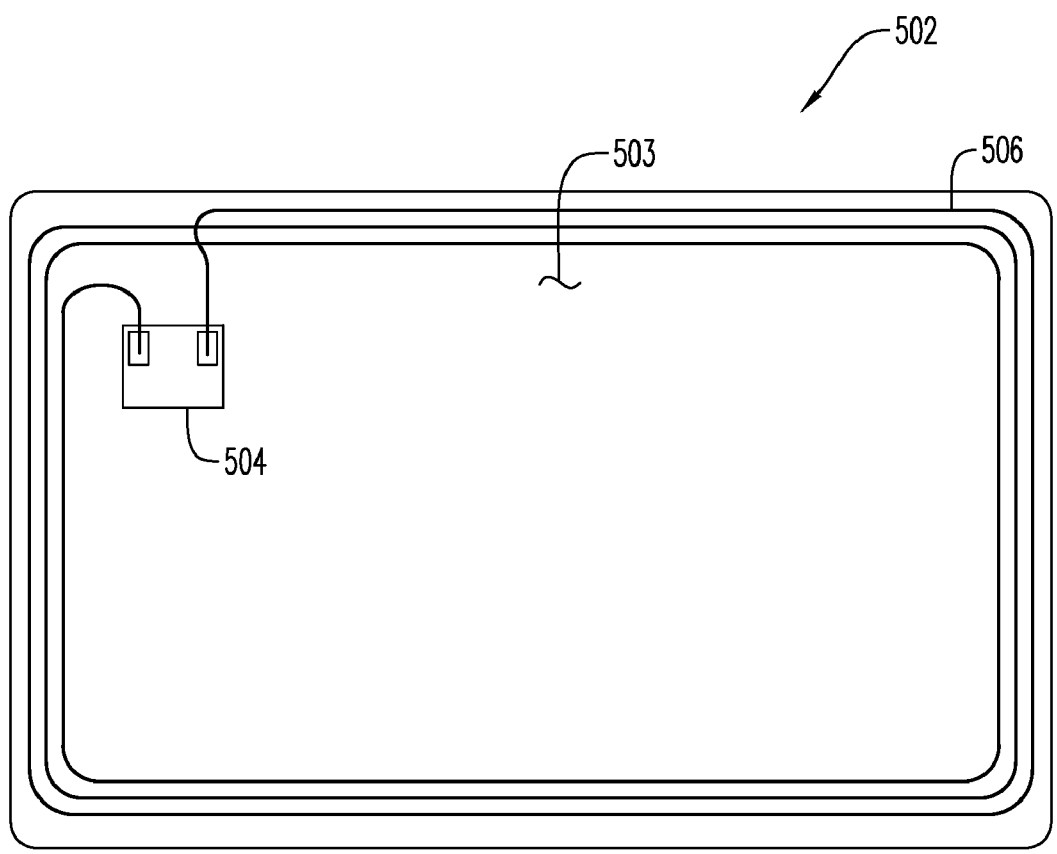
FIG. 5 is a schematic plan view, showing internal components, of another embodiment of a payment device.

Referring, then to FIG. 5, the payment device 502 may include a card-shaped body 503, which may resemble conventional payment cards in shape and size. The card-shaped body 503 may be formed of plastic or another suitable material.

The payment device 502 may also include an RFID IC 504. The RFID IC 504 may be mounted and/or installed in any suitable manner in the card-shaped body 503. For example, the RFID IC 504 may be embedded (partially or completely) in the card-shaped body 503. The RFID IC 504 may be suitably designed and configured to transmit payment card account information by radio frequency signaling to a POS terminal. In general, the RFID IC 504 may be designed and configured to operate in accordance with the "PayPass" standard promulgated by MasterCard International Incorporated, the assignee hereof.

The payment device 502 may further include an antenna 506 embedded in or otherwise mounted on the card-shaped body 503. As shown, the antenna 506 may be in the form of several loops arranged along the periphery of the card-shaped body. Alternatively, the antenna 506 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

Like the fob-shaped payment device 102 discussed above, the card-shaped payment device 502 may exhibit a metallic finish, so as to enhance the perceived value and esthetic appeal of the payment device 502. In the case of both devices 102 and 502, the metallic finish may be sufficiently thin so as to permit the RFID IC contained within the device to engage in wireless RF communication via the antenna with a reader device (which is not shown).

(Although not shown in FIG. 5, weighting elements as shown in FIG. 3 may also be present in the payment device 502.)

Figure 6:
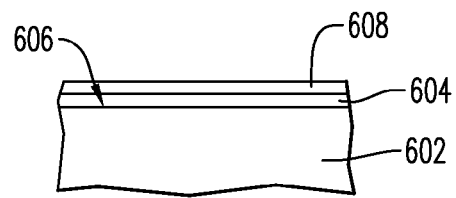
FIG. 6 is a partial schematic sectional view illustrating an external finish for the payment devices of FIGS. 1 and 5.

FIG. 6 is a partial schematic view illustrating in cross-sectional form the external finish for the payment devices 102 or 502. (This drawing, like the other drawings appended hereto, is not necessarily to scale.) Indicated at 602 is a representation of a portion of the bulk of the plastic body 302 or 503. A metallic finish coating 604 is formed on an outer surface 606 of the plastic bulk 602. The metallic finish coating 604 may for example be formed of one or more of gold, silver, platinum, copper, nickel and chrome. The thickness of the metallic finish coating 604 is selected to be sufficiently thin so as to permit the RFID IC and the antenna within the payment device to successfully engage in wireless RF communication with a reader (e.g., a proximity reader component at a POS terminal). It is well within the skill of those who are skilled in the art to determine, without undue experimentation, how thin to make the metallic finish coating to achieve the goal set forth in the preceding sentence.

The metallic finish coating 604 may cover a large part or all of some or all of the outer surfaces of the plastic body 102 or 502 (or of the holder 402). The metallic finish coating may be very shiny and may impart the appearance of a jewelry item to the payment device, but without interfering with the functioning of the payment device for use in purchase transactions at the point of sale.

Continuing to refer to FIG. 6, a clear protective coating 608 may be formed on the metallic finish coating 604 to cover and protect the metallic finish coating 604, while allowing the metallic finish coating 604 to be fully visible.

Figure 7:
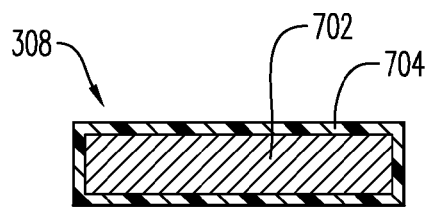
FIG. 7 is a sectional view which shows in isolation a weighting element which is included in the payment device illustrated in FIG. 3.

FIG. 7 is a sectional view which shows in isolation an example embodiment of a weighting element such as the weighting elements 308 discussed above in connection with FIGS. 3 and 4. In this example embodiment, the bulk (indicated at 702) of the weighting element 308 may be formed of soft iron. The bulk 702 may be coated by an insulator 704, such as a suitable plastic. The weighting element 308 may, for example, have a specific gravity that is about four times the specific gravity of the plastic bulk of the body 302.

Figure 8:
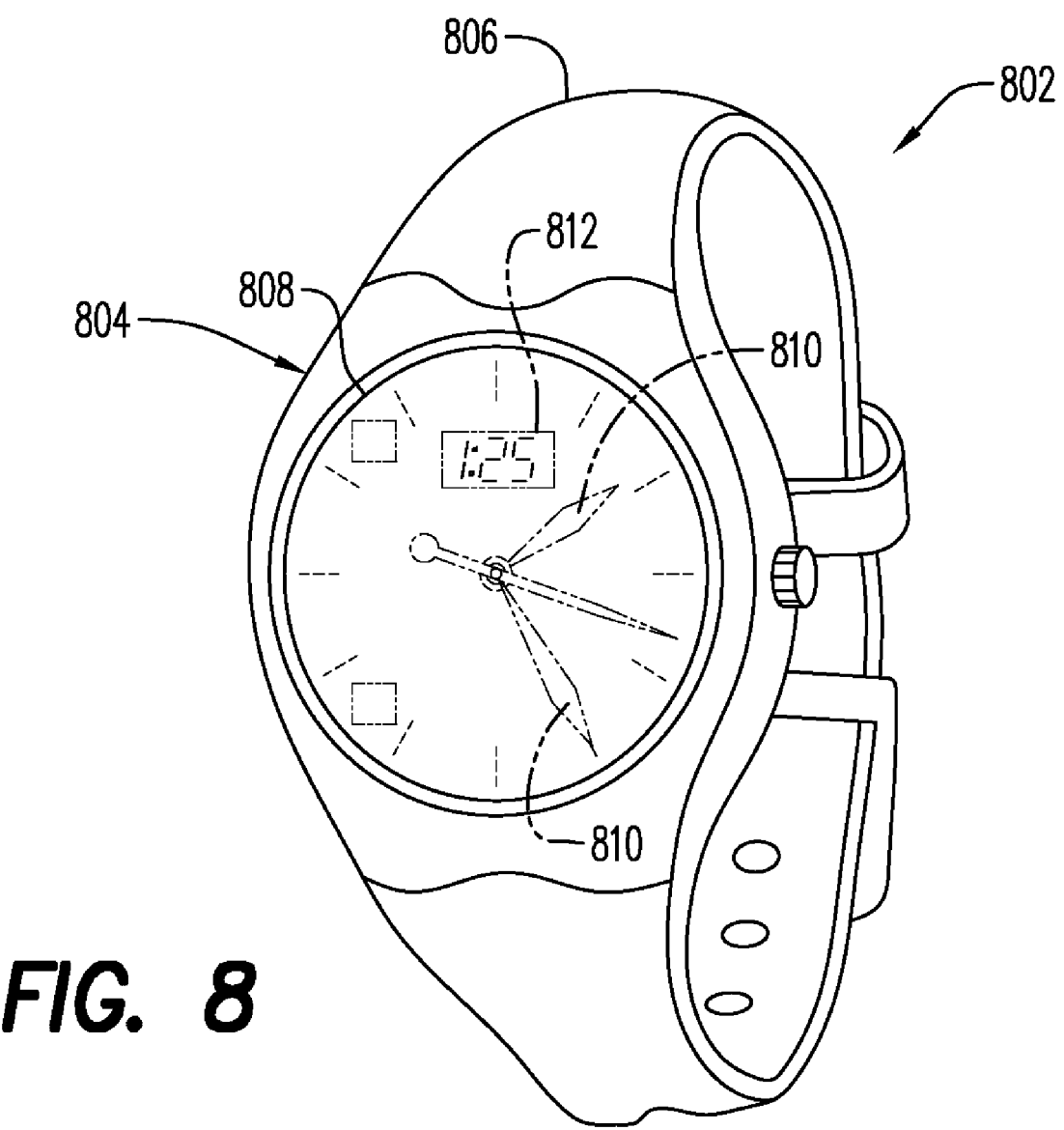
FIG. 8 is a perspective view of a payment-enabled wristwatch provided according to other embodiments.

FIG. 8 is a perspective view of a payment-enabled wristwatch 802 provided according to other embodiments. In many if not all of its functional and structural aspects, the wristwatch 802 may resemble an embodiment of the payment-enabled wristwatch disclosed in the above-referenced '587 published patent application.

The wristwatch includes a plastic housing 804 and a wristband 806 that is coupled to the housing 804 and serves to secure the housing 804 to the user's wrist (not shown). (Instead of the strap-type wristband illustrated in FIG. 8, the wristband may be in the form of a bracelet, as is also commonly employed with wristwatches.)

Carried on the housing 804 is a watch face 808 on which rotating hands 810 and/or a digital display 812 provide an indication of the time of day to the user.

Figure 9:
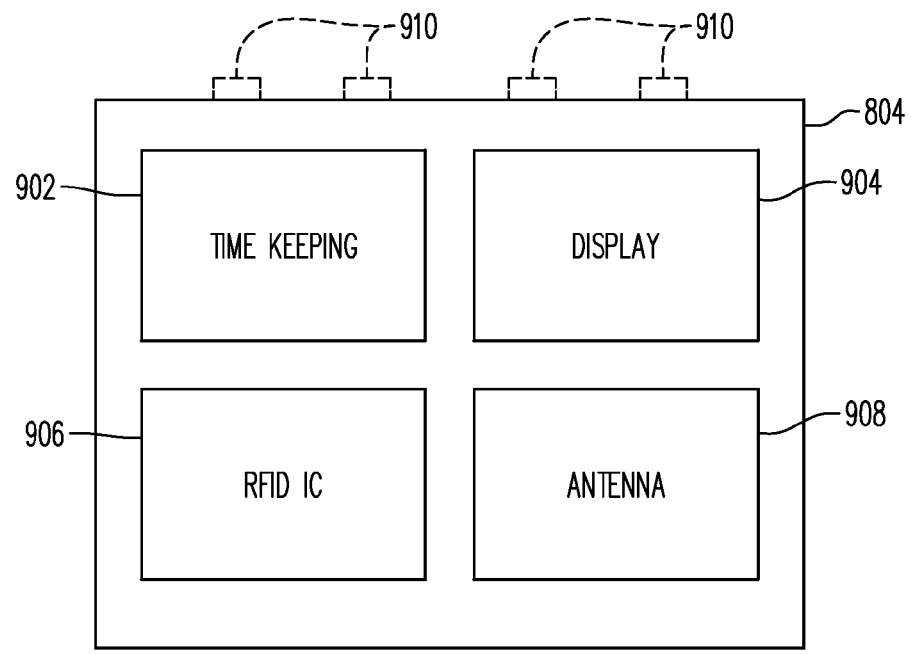
FIG. 9 is a schematic block diagram representation of a housing portion of the wristwatch of FIG. 8.

FIG. 9 is a schematic block diagram representation of the housing 804 of the wristwatch 802, with the housing 804 shown in isolation from the wristband. The following components are contained within, mounted on and/or embedded in the housing 804: (a) an electronic circuit 902 for keeping track of the passage of time; (b) one or more display components 904, such as the watch hands 810 or digital display 812, coupled to and driven by the time-keeping circuit 902; (c) an RFID IC 906; and (d) an antenna 908 coupled to the RFID IC 906. The latter two components may incorporate the same payment-transaction related functionality as was mentioned above in connections with RFID ICs 304, 504 and antennas 306, 506.

To enhance the esthetic appeal and perceived desirability and value of the payment-enabled wristwatch 802, the outer surface of the housing 804 may be finished in the same manner as described above in connection with FIG. 6—i.e., with a metallic finish that is thin enough not to prevent the payment-related functioning of the RFID IC 906 and antenna 908. In addition, in some embodiments, there may be mounted to the exterior of the housing 804 decorative elements 910 (shown in phantom), which may be like the decorative elements (e.g., precious, semi-precious or simulated precious stones) described above in conjunction with FIG. 1.

In operation, the user presents the payment device 102, 502 or 802 to a point of sale terminal (not shown). The RFID IC within the payment device is powered up by an interrogation signal from the POS terminal (more specifically from a proximity coupling device included in the POS terminal; however, in the case of the wristwatch 802, the RFID IC may alternatively draw power from the watch battery, which is not shown). In response to the interrogation signal the RFID IC operates to transmit to the POS terminal a payment card account number that has previously been stored in the RFID IC 104. The purchase transaction then is processed in the payment system with authorization request messaging and response in a conventional manner.

The principles taught herein have heretofore been described in the context of proximity payment devices. Nevertheless, these teachings are also applicable to cards, fobs or the like issued by transportation systems (e.g., mass transit systems) for access to the transportation systems; to cards used to identify the holder for purposes apart from or in addition to transaction payments; and to so-called electronic passports (also known as RFID-enabled passports). As used herein and in the appended claims the term "identification token" refers to an object that serves as one or more of a proximity payment device, a transportation card, an identification card and/or an RFID-enabled passport. The term "transportation card" refers to a card or similar device used to pay, or confirm or evidence payment of, a charge for using a transportation system. The term "RFID-enabled passport" refers to an internationally recognized travel document that includes an IC and an antenna and communicates with a terminal by a wireless communication technique.

Decorative elements, if included on a payment device as disclosed herein, may be provided according to any desired pattern or layout, and need not be in the layout shown in FIGS. 1 and 2.

The above description and/or the accompanying drawings are not meant to imply a fixed order or sequence of steps for any process referred to herein; rather any process may be performed in any order that is practicable, including but not limited to simultaneous performance of steps indicated as sequential.

The proximity payment cards described herein may be considered to be a sort of contactless smart card. The teachings of this application are thus applicable to contactless smart cards generally, as well as to so-called "dual interface" smart cards, which contain a set of contacts on a surface of the card to allow for direct contact interface to a terminal. "Dual interface" smart cards also include an antenna to allow for interfacing to a terminal by wireless transmission of signals.

As used herein and in the appended claims, the term "embedded" includes both completely and partially embedded.

As used herein and in the appended claims, "proximity reader" refers to any reading device that operates in accordance with the "PayPass" standard or any other standard for reading information from RFID devices.

As used herein and in the appended claims, "fob" refers to an item that is shaped and sized so as to be suitable for use as a keyfob.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An identification token, comprising:
   a plastic body;
   a radio frequency identification (RFID) integrated circuit (IC) embedded or contained in the plastic body;
   an antenna embedded or contained in the plastic body and coupled to the RFID IC;
   a metallic coating formed on the plastic body, the metallic coating sufficiently thin so as to permit wireless RF communication between the RFID IC and a proximity reader via the antenna, wherein the metallic coating is selected from the group consisting of gold, silver, platinum, copper, nickel and chrome; and a clear protective coating formed on the metallic coating so as to allow the metallic coating to be visible to a holder of the identification token.

2. The identification token of claim 1, wherein the metallic coating covers substantially all of all outer surfaces of the plastic body.

3. The identification token of claim 1, further comprising:
a plurality of decorative elements mounted on the plastic body so as to be visible through the clear protective coating, each of the decorative elements being a precious stone, semi-precious stone or simulated precious stone.

4. The identification token of claim 1, wherein the plastic body corresponds in shape to a standard identification card.

5. The identification token of claim 1, wherein the plastic body corresponds in shape to a fob.

6. The identification token of claim 1, further comprising:
at least one weighting element embedded in the plastic body, the at least one weighting element having a specific gravity that is at least twice as great as a specific gravity of the plastic body.

7. The identification token of claim 6, wherein the at least one weighting element is formed of ceramic, metal or granite.

8. The identification token of claim 7, wherein the at least one weighting element is formed of metal and is positioned in the plastic body so as not to prevent said wireless RF communication between the RFID IC and the proximity reader via the antenna.

9. The identification token of claim 1, wherein the RFID IC stores at least one payment card account number.

10. An identification token, comprising:
a plastic body;
a radio frequency identification (RFID) integrated circuit (IC) embedded or contained in the plastic body;
an antenna embedded or contained in the plastic body and coupled to the RFID IC; and
at least one weighting element embedded in the plastic body, the at least one weighting element having a specific gravity that is at least twice as great as a specific gravity of the plastic body, wherein the at least one weighting element includes a plurality of bodies formed of metal and positioned in the plastic body so as not to prevent wireless RF communication between the RFID IC and a proximity reader via the antenna, each of the bodies coated with an insulating material.

11. The identification token of claim 10, wherein the RFID IC stores at least one payment card account number.

12. The identification token of claim 10, wherein the at least one weighting element has a specific gravity that is at least four times as great as the specific gravity of the plastic body.

13. The identification token of claim 10, wherein the plastic body corresponds in shape to a standard identification card.

14. The identification token of claim 10, wherein the plastic body corresponds in shape to a fob.

15. A payment-enabled wristwatch, comprising:
a plastic housing;
a wristband or bracelet, coupled to the plastic housing, for securing the plastic housing to a user's wrist;
time means associated with the plastic housing for tracking passage of time;
display means, coupled to the time means and associated with the housing, for displaying a time-of-day indication to the user;
a radio frequency identification (RFID) integrated circuit (IC) supported by and/or embedded in the plastic housing, the RFID IC storing at least one payment card account number;
an antenna supported by and/or embedded in the plastic housing and coupled to the RFID IC;
a metallic coating covering at least a portion of an outer surface of the plastic housing, the metallic coating sufficiently thin so as to permit wireless RF communication between the RFID IC and a proximity reader via the antenna, wherein the metallic coating is selected from the group consisting of gold, silver, platinum, copper, nickel and chrome; and
a clear protective coating formed on the metallic coating so as to allow the metallic coating to be visible to the user.

16. The wristwatch of claim 15 further comprising:
a plurality of decorative elements mounted on the plastic housing so as to be visible through the clear protective coating, each of the decorative elements being a precious stone, semi-precious stone or simulated precious stone.

* * * * *